United States Patent
Tsubokawa

(10) Patent No.: US 6,176,691 B1
(45) Date of Patent: Jan. 23, 2001

(54) REFRIGERANT COMPRESSOR

(75) Inventor: Masahiro Tsubokawa, Kusatsu (JP)

(73) Assignee: Matsushita Electric Industrial Co., Ltd. (JP)

(*) Notice: Under 35 U.S.C. 154(b), the term of this patent shall be extended for 0 days.

(21) Appl. No.: 09/231,086

(22) Filed: Jan. 14, 1999

Related U.S. Application Data

(63) Continuation-in-part of application No. 08/837,849, filed on Apr. 22, 1997, now abandoned.

(51) Int. Cl.$^7$ .................................................. F04B 17/00
(52) U.S. Cl. ................................ 417/410.3; 417/423.7; 310/215
(58) Field of Search ..................... 417/410.3, 423.7; 310/215, 54, 86

(56) References Cited

U.S. PATENT DOCUMENTS

| 2,508,850 | 5/1950 | Wirth | 310/215 |
| 2,701,316 * | 2/1955 | Willits et al. | 310/215 |
| 2,935,859 | 5/1960 | Marvin | 310/215 |
| 3,209,992 | 10/1965 | Christiansen | 310/215 |
| 4,198,458 | 4/1980 | Mitsuishi et al. | 428/212 |
| 5,093,758 | 3/1992 | Funaki et al. | 361/323 |

FOREIGN PATENT DOCUMENTS

| 403064678 * | 3/1991 | (JP) | 310/215 |
| 03096343 * | 4/1991 | (JP) | 310/215 |

* cited by examiner

Primary Examiner—Timothy S. Thorpe
Assistant Examiner—Cheryl J. Tyler
(74) Attorney, Agent, or Firm—Parkhurst & Wendel, L.L.P.

(57) ABSTRACT

In an electric motor, a stator is formed with multiple slots axially on the inner circumference thereof. Provided inside of each slot are an outer slot insulation film and an inner insulation film each made of a material having a different dielectric constant from the other. The slot insulation films assure such an earth capacitance as not to adversely affect a refrigerant compressor while allowing the increase in efficiency of the electric motor.

2 Claims, 3 Drawing Sheets

REFRIGERANT COMPRESSOR

This application is a Continuation-in-part of Ser. No. 08/837,849 filed Apr. 22, 1997 now abandoned.

TECHNICAL FIELD

The present invention relates to a refrigerant compressor incorporated in, for example, air conditioners, refrigerators and the like.

BACKGROUND ART

A shown in FIG. 3, a conventional refrigerant compressor comprises a closed vessel 1 housing an electric motor 4 comprised of a stator 2 and a rotor 3, and a compression equipment 5 disposed under the electric motor 4. The compression equipment 5 has a suction pipe 6, to which an accumulator 7 is attached. A delivery pipe 8 extends from a top portion of the closed vessel 1.

The refrigerant compressor of this arrangement is generally incorporated into air conditioners, refrigerators and the like. In keeping with the current trend towards energy savings, there is a strong demand for an improved efficiency of the compression mechanism as well as an improved efficiency of the electric motor.

The improvement of efficiency of the electric motor is primarily accomplished by increasing core lengths of the stator and the rotor or by changing the coil winding specifications (or increasing the number of turns) for the stator and the rotor. In both cases, however, an increased earth capacitance of the electric motor results in an increased current leakage from the air conditioner or the refrigerator.

That is, because the stator 2 and rotor 3 constituting the electric motor 4 for the refrigerant compressor are housed inside a closed vessel 1 together with the compression equipment 5, they are exposed to a refrigerant gas having a higher dielectric constant than that of the air, so that the earth capacitance of the electric motor increases.

Because of this, there has been a problem that current leakage is liable to occur in the electric motor for the refrigerant compressor.

It has been found that such current leakage can be effectively reduced by decreasing the earth capacitance of the refrigerant compressor, i.e., by reducing the electrostatic capacity of the electric motor housed inside the closed vessel.

However, such countermeasures as to decrease the thickness of a laminated core of a stator and a rotator or to decrease the number of turns of wiring will lower the efficiency of the electric motor. Thus, none of the countermeasures can be effective.

In view of this, the earth capacitance of the electric motor is reduced by enhancing the insulation characteristic of a slot. The enhanced insulation characteristic of the slot may be accomplished by decreasing the surface area of the winding inside the slot or of the slot itself, or otherwise by applying an insulation film of a greater thickness or of a multi-layered structure to the slot.

In the case of enhancing insulation characteristic by means of slot insulation film, polyethylene terephthalate (hereinafter referred to as "PET") is generally used for the insulation film for use in the electric motor 4 because of the general characteristics thereof including insulating performance, durability, mechanical strength, costs and the like. In cases where the efficiency of the motor is to be increased by increasing the number of turns of the stator, an insulation film of a great thickness or of double-layered structure is applied to the slot for the reduction of the earth capacitance.

However, the volume of the wound coil insertable in the slot and the thickness of the insulation film are in a reciprocal relation to each other. Therefore, the efficiency of the electric motor has been increased to such a level that the further effect can not be provided to reduce the earth capacitance of the refrigerant compressor.

On the other hand, in case where polyethylene naphthalate (hereinafter referred to as "PEN") having a low dielectric constant, for example, is used for the slot insulation film for use in the refrigerant compressor, the resultant film is stable in a refrigerant and a lubricant, and is also effective at reducing the earth capacitance. Unfortunately, however, the film has poor mechanical characteristics, or a poor tear strength, in particular. Accordingly, when the insulation film is inserted in the narrow slot prior to the coil, a tear may be produced in the film at an end portion thereof. The coil subsequently fitted in the slot is caused to expose itself from such tear, leading to an insulation failure taking place between the coil and the stator and/or rotor core.

DISCLOSURE OF THE INVENTION

The present invention is intended to overcome the difficulty to provide a positive reduction of the earth capacitance of the electric motor operated in the atmosphere of a refrigerant gas for a refrigerant compressor. It is, therefore, an object of the invention to provide slot insulation films which assure such an earth capacitance as not to adversely affect the refrigerant compressor, while allowing the increase in laminated core thickness or in the number of coil winding to increase the efficiency of the electric motor.

For achieving the above object, a refrigerant compressor according to the invention comprises a closed vessel housing a compression mechanism and an electric motor, said compression mechanism being connected to an accumulator via a suction pipe, said electric motor being constituted of a stator and a rotor, characterized in that each of a multiplicity of slots formed on the rotor-side inner circumference of the stator is provided inside thereof with two slot insulation films layered with one over the other and having dielectric constants different from each other.

In addition, one of the slot insulation films has a high tear strength and the other has a low dielectric constant, and the slot insulation film having a high tear strength is layered on the outer side. Further, one of the layered slot insulation films is made of PET and the other is made of PEN.

The above arrangement assures such an earth capacitance as not to adversely affect the refrigerant compressor without causing reduction in efficiency and reliablility of the electric motor operated in the atomophere of a refrigerant gas. Hence, a stable refrigerant compressor suffering minimal current leakage can be provided at low costs. The arrangement allows not only the reduction of the earth capacitance of the electric motor but also the increase in the number of turns of the coil inserted in the slot. Thus, there can be provided a refrigerant compressor with a further increased efficiency.

PREFERRED EMBODIMENT

Figure 1:
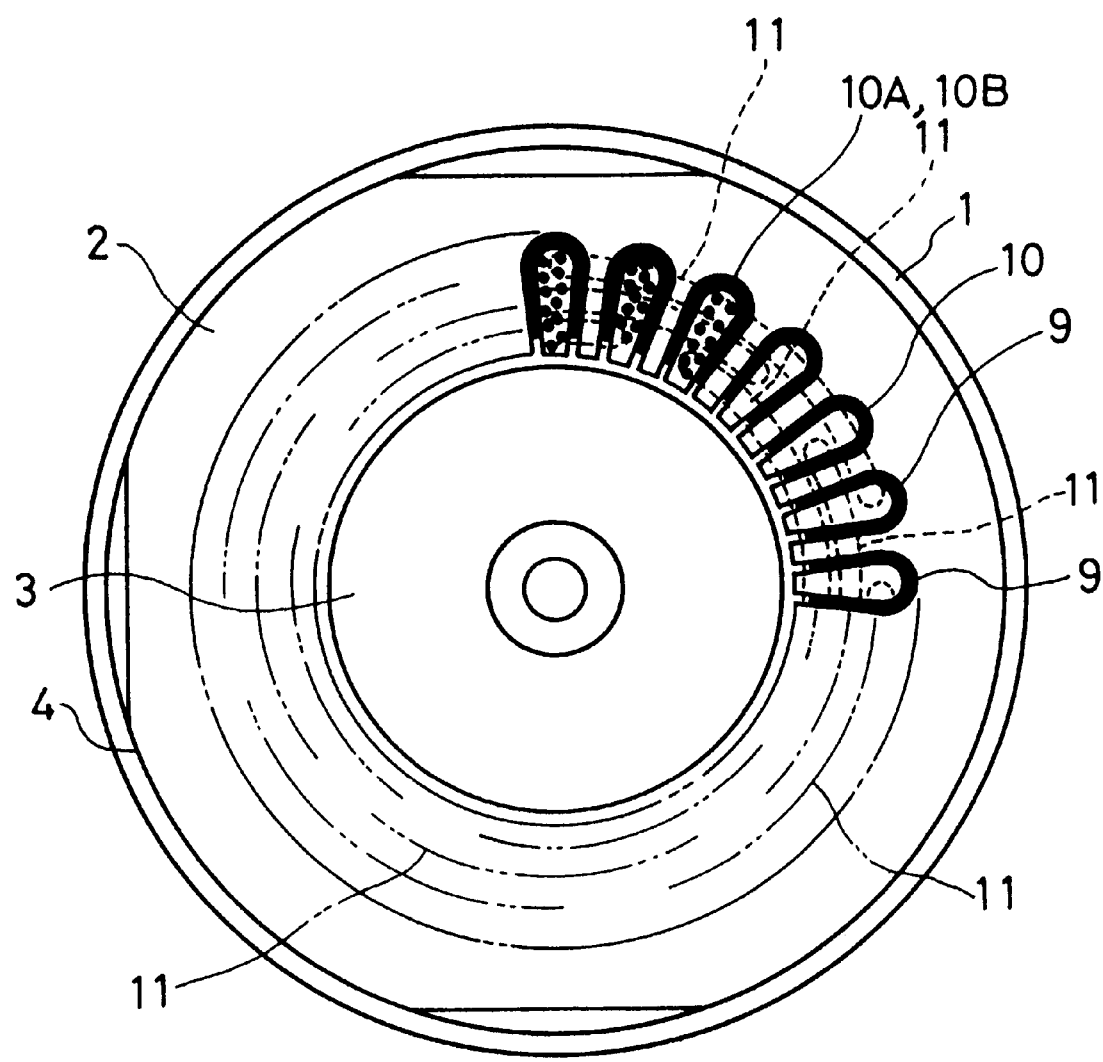
FIG. 1 is a transverse sectional view of an embodiment of the present invention.
Figure 2:
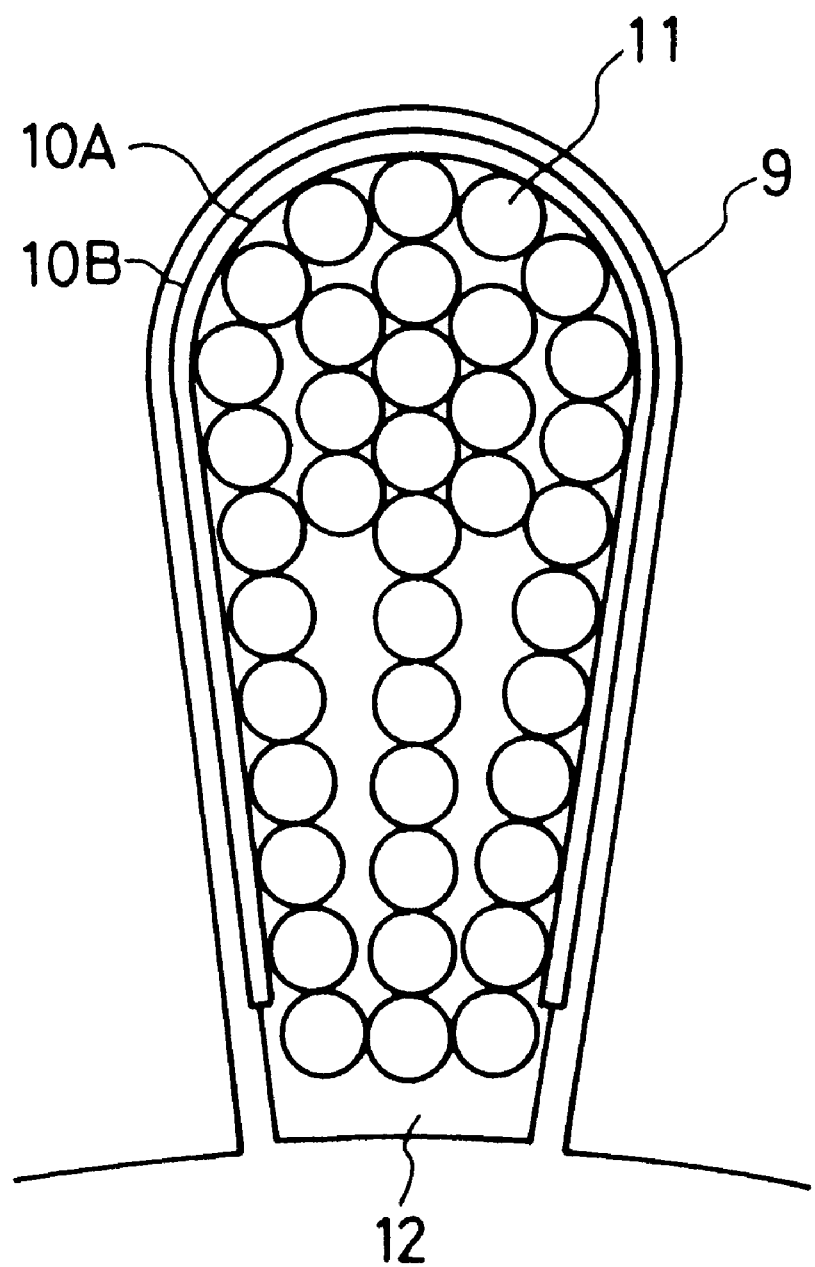
FIG. 2 is an enlarged view of a slot of the stator of a refrigerant compressor according to the invention.
Figure 3:
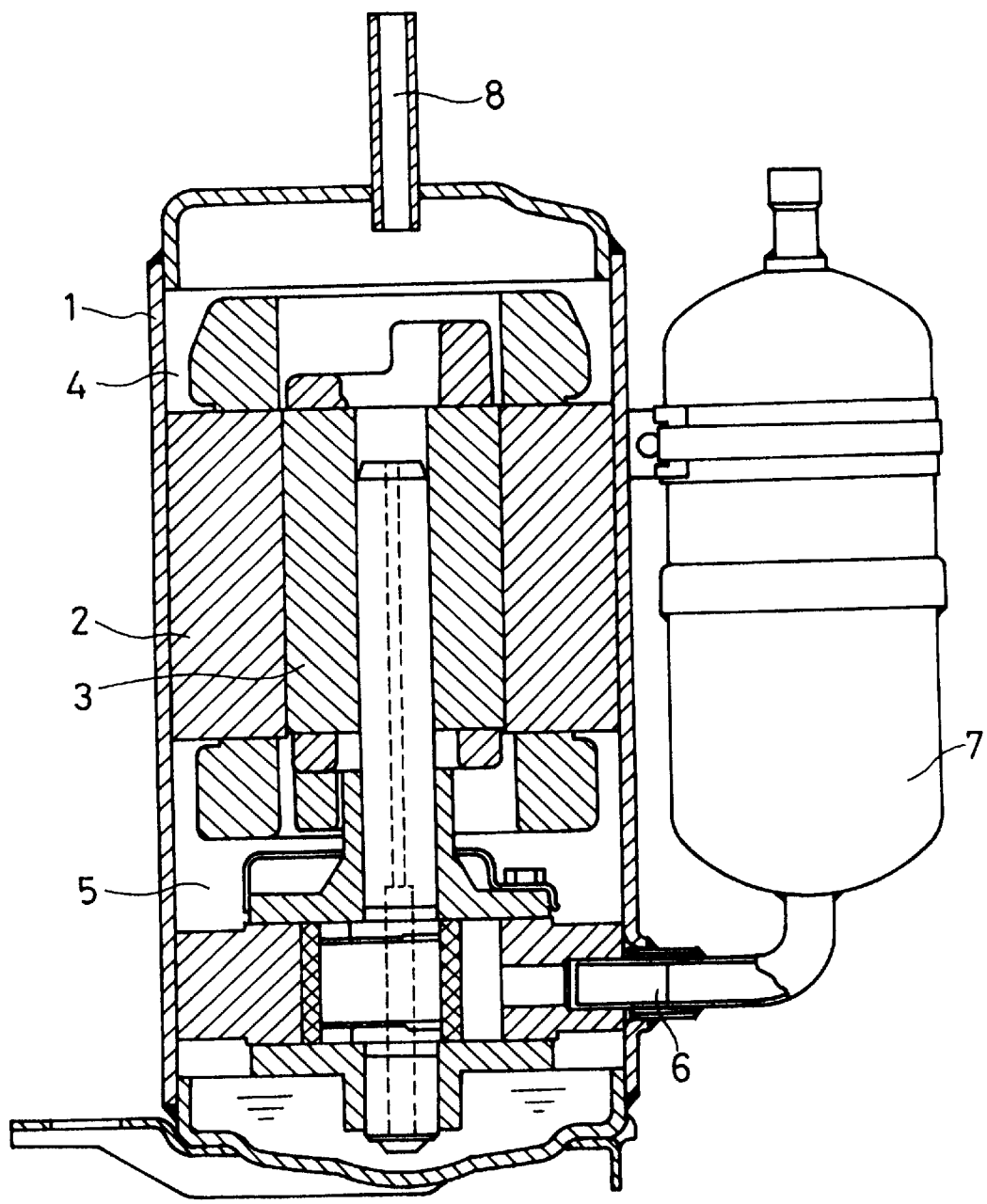
FIG. 3 is a vertical sectional view of a conventional refrigerant compresor.

Now, an embodiment of the invention will be described with reference to the accompanying drawings. In FIGS. 1 and 2, parts of a like kind are labeled with the same reference numeral as used in FIG. 3.

The embodiment of the invention will be described by way of an example in which an inner slot insulation film 10A is made of PEN and an outer slot insulation film 10B is made of PET, as shown in FIG. 2.

Referring to FIGS. 1 and 2, a closed vessel 1 contains therein an electric motor 4 constituted of a stator 2 and a rotor 3. Disposed beneath the electric motor 4 is compression equipment 5 (see 5 in FIG. 3). The stator 2 contains a multiplicity of slots 9 formed axially on the rotor-side inner circumference thereof.

As seen in FIG. 2, inserted into each slot 9 and layered on the inner surface thereof are the inner slot insulation film 10A and the outer slot insulation film 10B each being made of a material having a different dielectric constant from that of the other.

Further, coils 11 are inserted into each slot 9. In case of a motor of a three-phase four-wire system including twenty-four slots 9, for example, coils 11 are inserted in every four slots 9. And a wedge-form insulation film 12 is provided for the coils 11 on the side of the rotor 3.

It is to be noted that the slot insulation films 10A and 10B are inserted in the slot 9 prior to the insertion of the coils 11.

The PEN used for the inner slot insulation film 10A has properties as shown in Table 1. Because it has a dielectric constant lower than that of the PET used for the outer slot insulation film 10B, the PEN is advantageous in reducing the earth capacitance of the electric motor. In addition, the PEN presents a higher temperature limit available for continuous use as compared with the PET, thereby enhancing the thermal resistance of the inner slot insulation film 10A and improving the reliability thereof.

Since the slot insulation films are inserted in a bent form, as shown in FIG. 2, the insulation films are required to have a high mechanical strength such as a tear strength in order to assure the insulation characteristic thereof. In the embodiment of the present invention, by virtue of such structure that the outer slot insulation film made of PET having a superior tear strength is layered over the inner slot insulation film made of PEN having a superior insulation characteristic, even if the PEN film having a low tear strength is caused to be cracked or torn while being inserted in the slot, the PET film assures the insulation characteristic required of the slot insulation films without harming the reliability thereof.

TABLE 1

|  |  | PEN 25 µm | PET 25 µm |
|---|---|---|---|
| Dielectric Constant (25° C.) | 60 Hz | 3.0 | 3.2 |
|  | 1 KHz | 2.9 | 3.1 |
|  | 1 GHz | 2.9 | 3.0 |
| Temperature for Continuous Use | Mechanical Aspect | 160° C. | 105° C. |
|  | Electric Aspect | 180° C. | 105° C. |

What is claimed is:

1. A refrigerant compressor comprising a closed vessel housing a compression mechanism and an electric motor, said compression mechanism being connected to an accumulator via a suction pipe, said electric motor being constituted of a stator and a rotor and disposed in the atmosphere of a refrigerant gas, wherein each of a multiplicity of slots formed on a rotor-side inner circumference of the stator is provided inside thereof with slot insulation consisting of two films layered with one over the other;

an outer layer film (10B) of the two slot insulation films has a higher tensile strength than the other film (10A); and an inner layer film (10A) of the two slot insulation films has a lower dielectric constant than the other film (10B).

2. A refrigerant compressor according to claim 1, wherein an outer layer film (10B) one of the two slot insulation films is made of polyethylene terephthalate; and an inner layer film (10A) of two slot insulation films is made of polyethylene naphthalate.

* * * * *